United States Patent [19]

Sawada et al.

[11] Patent Number: 5,216,421
[45] Date of Patent: Jun. 1, 1993

[54] INDICATOR FOR SMALL WATERCRAFT

[75] Inventors: Ryoji Sawada; Satoshi Yamamoto, both of Mori, Japan

[73] Assignee: Moriyama Kogyo Kabushiki Kaisha, Mori, Japan

[21] Appl. No.: 588,020

[22] Filed: Sep. 25, 1990

[30] Foreign Application Priority Data

Sep. 25, 1989 [JP] Japan .................................. 1-246392

[51] Int. Cl.⁵ ............................................. G08B 23/00
[52] U.S. Cl. ...................................... 340/984; 440/2; 440/38; 441/36
[58] Field of Search ............... 340/984, 438, 439, 450, 340/450.2, 450.3, 461; 440/2, 38; 441/36

[56] References Cited

U.S. PATENT DOCUMENTS

| | | | |
|---|---|---|---|
| 4,023,137 | 5/1977 | Olsbo et al. | 340/450.2 |
| 4,503,419 | 3/1985 | Kidd et al. | 340/450.3 |
| 4,871,996 | 10/1989 | Tsunamoto et al. | 340/984 |
| 4,876,529 | 10/1989 | Kubota et al. | 340/450.3 |
| 4,912,646 | 3/1990 | Cerruti | 340/450.2 |
| 4,988,996 | 1/1991 | Ito | 340/984 |

FOREIGN PATENT DOCUMENTS

| | | | |
|---|---|---|---|
| 0204194 | 8/1990 | Japan | 440/2 |
| 0252837 | 6/1926 | United Kingdom | 340/450 |

Primary Examiner—Jin F. Ng
Assistant Examiner—Brent A. Swarthout
Attorney, Agent, or Firm—Ernest A. Beutler

[57] ABSTRACT

An indicator assembly for watercraft having an engine is provided. The indicator assembly comprises a first detector for detecting an operating condition of the watercraft, such as a fluid level, an indicator for indicating this detected operating condition, a switching assembly for actuating the indicator, a second detector for outputting a signal to the switching assembly when the engine is in the on or running state. The indicator assembly is designed so that the switching assembly actuates the indicator when the switching assembly receives the signal from the second detector but does not actuate the indicator when the signal is not received by the switching assembly after a predetermined time.

9 Claims, 3 Drawing Sheets

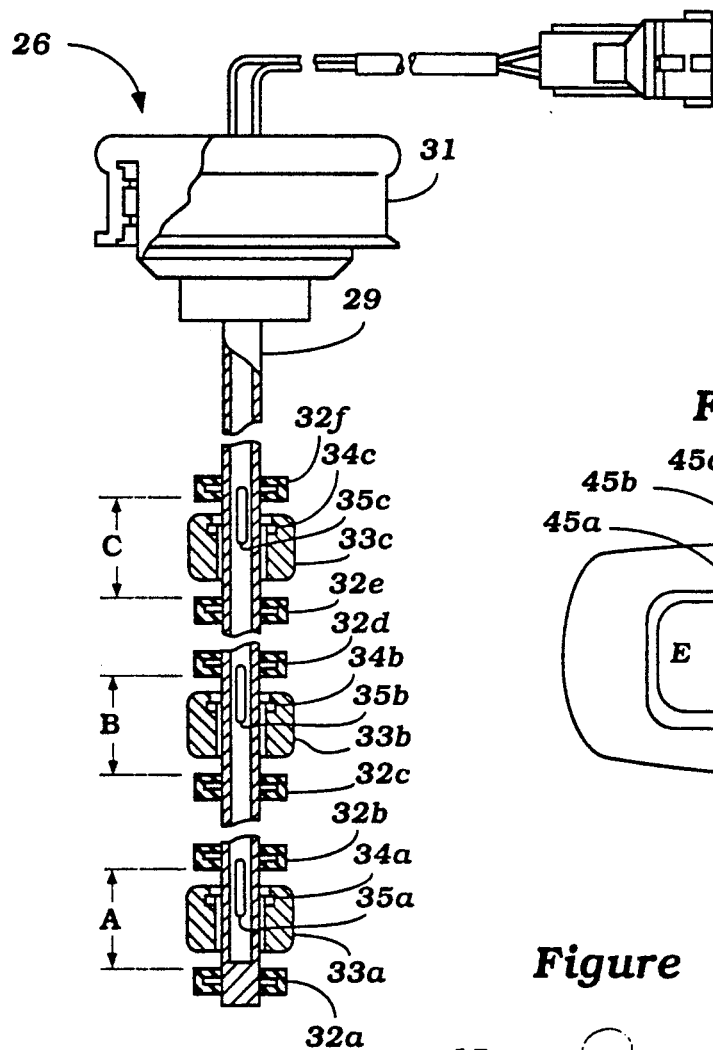
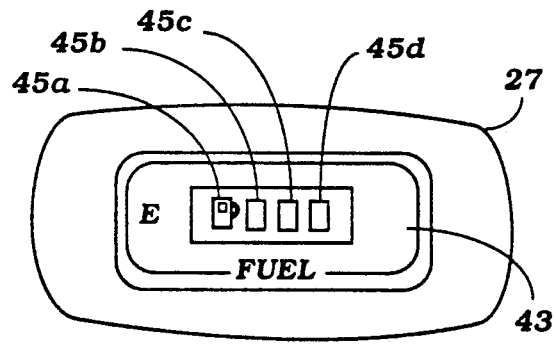
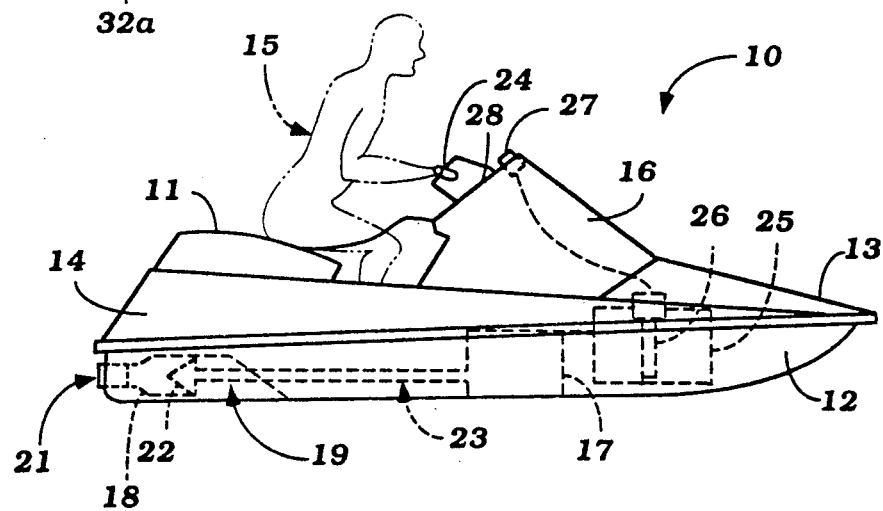

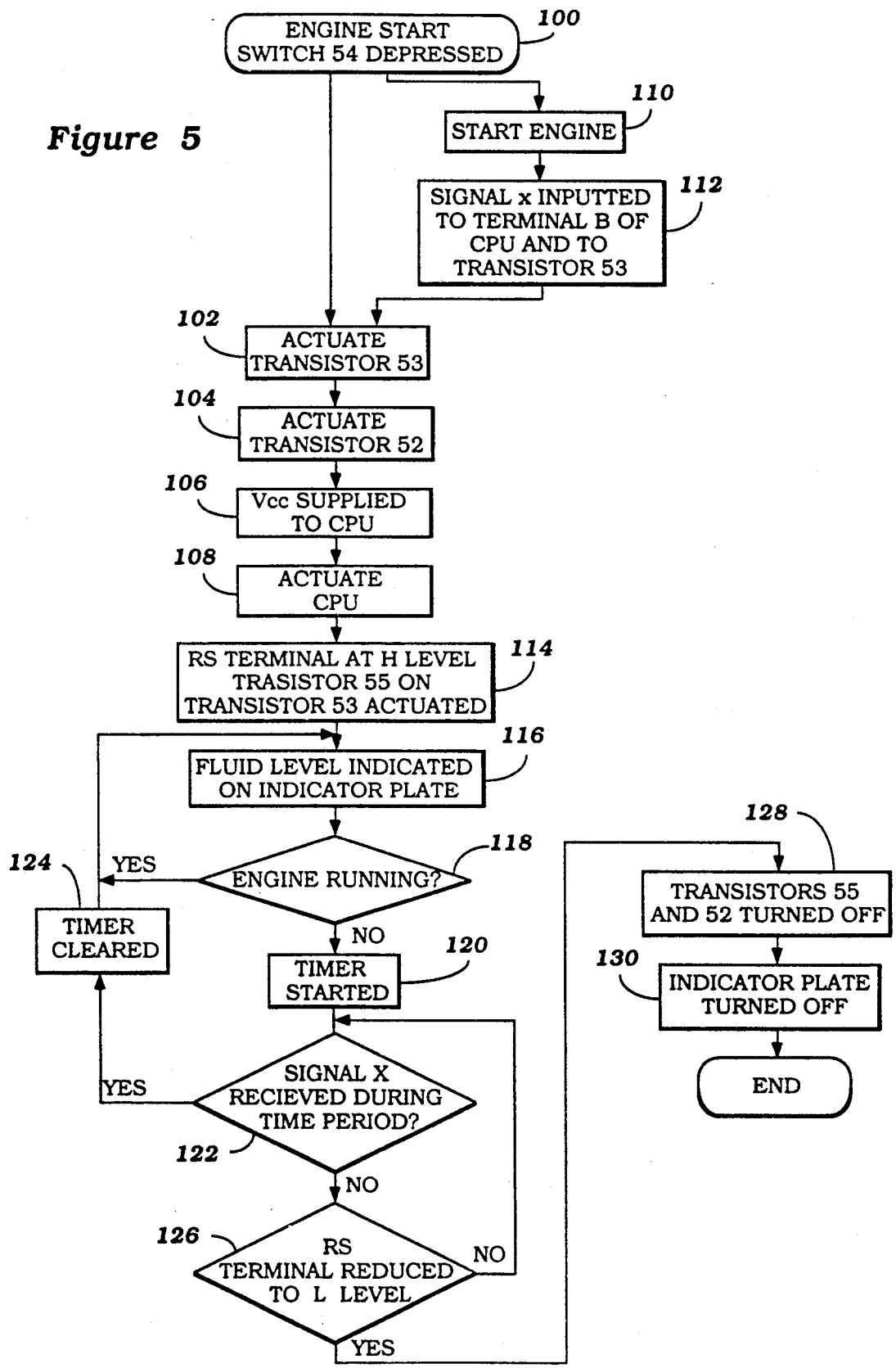

INDICATOR FOR SMALL WATERCRAFT

BACKGROUND OF THE INVENTION

This invention relates to an indicator assembly for a small watercraft, and more particularly to an indicator assembly which includes an indicator plate which is actuated only when necessary and which does not require a separate switch for actuation.

One type of particularly popular small watercraft is of the jet propelled type and is designed to be operated by a single rider who is seated on the seat in straddle-like fashion. This type of small watercraft is highly maneuverable and is very sporting in nature. A control bridge is normally located forwardly of the seat and carries handlebars which are positioned where the rider may conveniently grasp them to steer the watercraft. An instrument panel may also be positioned on the control bridge in view of the rider and sometimes includes a key switch adapted for connecting the instrument panel with a battery so that the indicators on the instrument panel may be turned on and off by rotation of the key.

However, because of the sporting manner in which this type of watercraft is operated, it is quite common during operation for water to splash onto the instrument panel. When a rotary type key switch arrangement is used to actuate the indicators on the instrument panel, water may enter the key hole and, as a result, may damage or corrode the instrument panel components. An arrangement has been proposed wherein such a key switch is eliminated and the indicators are continuously maintained in an actuated state. With this type of arrangement, however, consumption of battery power is unnecessarily increased. An arrangement has also been proposed which utilizes another type of switch instead of a key switch operable to disconnect the battery from the instrument panel indicators. However, this type of arrangement has required a separate instrument panel switch.

It is therefore a principal object of this invention to provide an indicator assembly for a small watercraft which does not require a separate key switch or a separate instrument panel switch for actuation and instead permits the indicators of the instrument panel to become actuated only when necessary.

It is a further object of this invention to provide an indicator assembly for a small watercraft which does not continuously draw on the battery and which decreases overall battery consumption.

It is yet another object of this invention to provide an indicator assembly for a small watercraft which does not increase the number of switches for actuation of the indicators.

SUMMARY OF THE INVENTION

An indicator assembly for a small watercraft having an engine is provided. The indicator assembly comprises first detecting means for detecting a particular operating condition of the watercraft, such as a fluid level, instrument indicating means for indicating this detected operating condition switching means for actuating the instrument indicating means, second detecting means for outputting a signal to the switching means when the engine is in a particular operational state, for example the on or running state. The indicator assembly is designed so that the switching means actuates the instrument indicating means when the switching means receives the signal from the second detecting means but does not actuate the instrument indicating means when the signal is not received by the switching means after a predetermined time.

BRIEF DESCRIPTION OF THE DRAWINGS

FIG. 1 is a side elevational view of a small watercraft showing a rider in phantom seated on the seat Of the watercraft constructed in accordance with an embodiment of the invention.

FIG. 2 shows a fluid level detector in accordance with one embodiment of the invention, with parts shown in cross section and other parts broken away.

FIG. 4 shows the fuel meter and indicator plate in accordance with one embodiment of the invention.

FIG. 5 is an operational flow diagram of one embodiment of the invention.

DETAILED DESCRIPTION OF THE PREFERRED EMBODIMENTS

Figure 3:
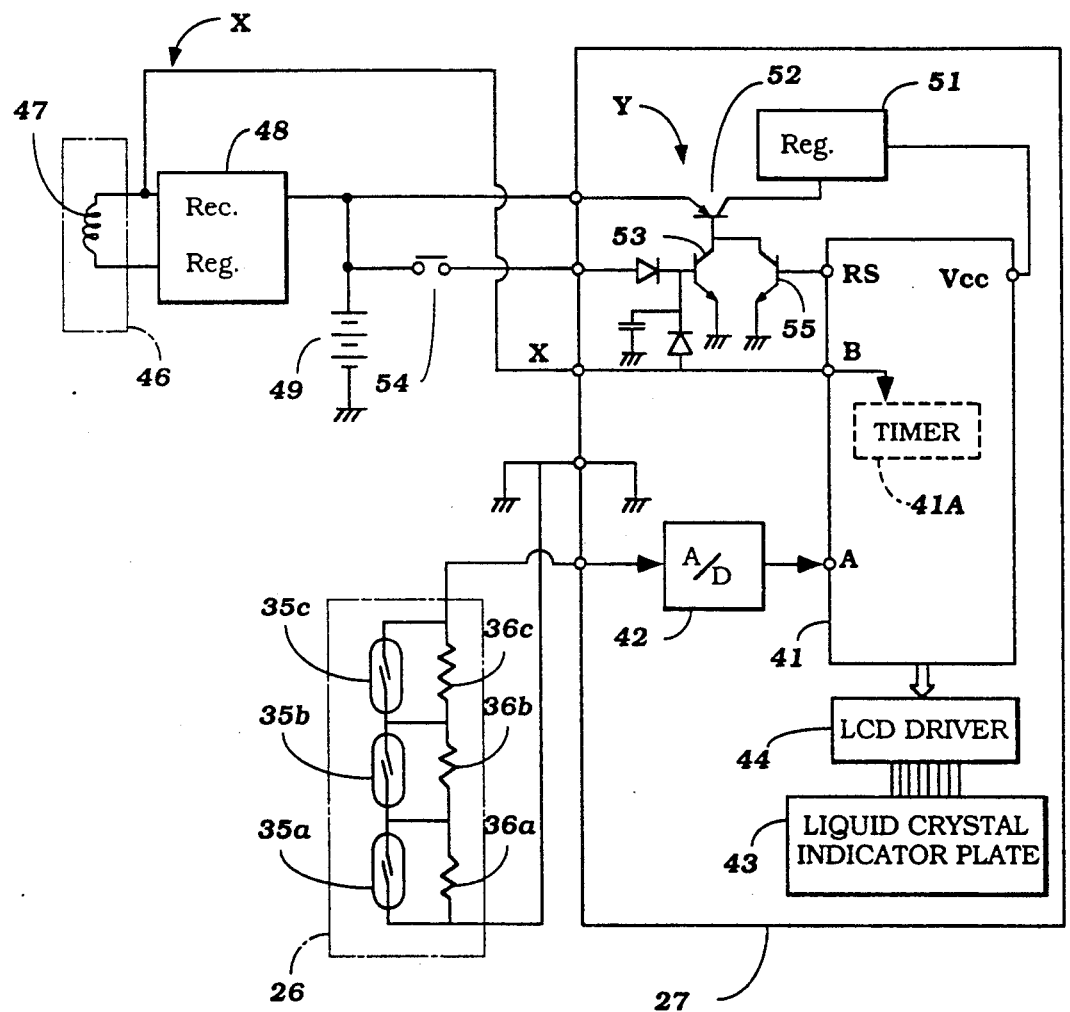
FIG. 3 is a circuit diagram in accordance with one embodiment of the invention.

Referring first to FIG. 1, a small watercraft constructed in accordance with an embodiment of the invention is identified generally by the reference numeral 10. This small watercraft 10 is depicted as being of the jet propelled type designed to be operated by a single rider 15 seated in straddle fashion in the seat 11 of the watercraft 10. It is to be understood, however, that the invention may be utilized in conjunction with other types of watercraft. The invention has, however, particular utility in the type of watercraft described and depicted herein.

The watercraft 10 is comprised of a hull having a lower portion 12 and a deck portion 13 each of which may be conveniently formed from a molded fiberglass reinforced plastic, as is well known in this art. The seat 11 is positioned rearwardly of the deck portion 13 and has a pair of depressed foot areas that are disposed on opposite sides thereof and which are positioned inwardly of raised gunnels 14. As may be seen, the rider 15, shown in phantom in FIG. 1, may be seated on the seat 11 with his feet and lower legs in the depressed foot areas.

A control bridge 16 is provided forwardly of the seat 11 on the deck portion 13 and an internal combustion engine 17 is positioned beneath the bridge 16 within an engine compartment formed by the lower portion of the hull 12 and the deck portion 13. This internal combustion engine 17 drives a jet propulsion unit which is positioned within a tunnel formed at the rear of the lower hull portion 12 beneath the seat 11.

A water passage 18 is formed in the rear of the lower portion of the hull 12 and extends from a water intake port 19 provided in the bottom of lower hull portion 12 to a pivotally supported discharge nozzle 21 which is positioned in the rear end of the lower hull portion 12. This discharge nozzle 21 is pivotal about a vertically extending axis for steering purposes, as is well known in this art. Disposed in the water passage 18 is a propeller 22 having a propeller shaft 23 which is driven by the engine 17. In operation, water is drawn in through the intake port 19 into the water passage 18 and is injected out of the discharge nozzle 21 so as to produce the propulsion force for driving the watercraft 10.

A handlebar assembly 24 is carried by the bridge 16 forwardly of the seat 11 and includes handlebars in a position where the rider 15 may conveniently grasp them to steer the discharge nozzle 21. As is common in this art, a steering lever extends outwardly from one side of the steerable discharge nozzle 21 and is connected by means of a bowden wire to a steering arm formed at the lower end of the handlebar assembly 24 for steering of the watercraft 10.

A fuel tank 25 is disposed forwardly of the engine 17 in the lower portion of the hull 12. Extending into the fuel tank 25 is a first detecting means which includes a fluid level detector 26 whose output signal is transmitted to a fuel meter 27 mounted on an instrument panel 28 for indicating the amount of fuel remaining in the tank 25.

Referring now to FIG. 2, the fluid level detector 26 includes a cylindrical guide 29 extending downwardly into the fuel tank 25 from a cap 31. Six stoppers 32a through 32f are affixed to the guide 29. Stoppers 32a and 32b define an area designated by the letter A along the cylindrical guide 29; stoppers 32c and 32d define an area B along the guide 29; and stoppers 32e and 32f define an area C along the guide 29. Three floats 33a through 33c having permanent magnets 34a through 34c respectively are slidably received for movement along the cylindrical guide 29 within the areas A, B or C respectively. The detector 26 further includes three reed type switches 35a through 35c, one associated with each float 33a through 33c and resistors 36a through 36c connected in parallel with the reed switches 35a through 35c respectively (see FIG. 3).

The top and bottom of each of the stoppers 32a through 32f is covered with a rubber material to absorb the shocks associated with the movement of the floats 33a through 33c along the cylindrical guide 29, which occurs as a result of the variations in the fluid level in the fuel tank 25.

Referring now to FIG. 3, the reed switches 35a through 35c are connected in series with one end of the circuit being grounded and connected to the earth terminal end of the fuel meter 27. The other end of the circuit is connected to a data input terminal A of a central processing unit (CPU) or microprocessor indicated by the numeral 41 through an A/D converter 42.

As the floats 33a through 33c move within their respective areas A, B, or C in response to the fluid level in the fuel tank 25, their associated magnets 34a through 34c open and close the corresponding reed switches 35a through 35c depending on the position of the associated float 33a through 33c. The CPU 41 receives a signal at its input terminal A from the fluid level detector 26 and determines the fluid level in the tank 25 based on the variation in resistance or output voltage of the fluid level detector 26, and transmits a signal indicative of this level to an instrument indicating means which, in this embodiment, comprises a liquid crystal indicator plate 43 and an LCD driver 44.

As shown in FIG. 4, the indicator plate 43 of fuel meter 27 has four indicator elements 45a and 45d. When the fluid level in tank 25 is at a level below all of the floats 33a through 33c, all reed switches 35a through 35c are in the off state and indicator element 45a flashes on and off. As the fluid level is raised so as to come into contact with and cause upward movement of float 33a, reed switch 35a turns on and causes indicator element 45b to light. As the fluid level is further raised so as to cause upward movement of float 33b and then float 33c, reed switches 35b and 35c turn on successively to light the indicator elements 45c and 45d in order.

In FIG. 3, a second detecting means is indicated generally by the letter X and comprises an electromagnetic generator 46 having a generator coil 47. The output voltage from the coil 47 is rectified in a rectifying-voltage controlling circuit 48 to a predetermined voltage (i.e., 12 V) and flows to the positive terminal of a battery 49. The voltage output from the generator coil 47 also provides an alternate current voltage signal x during operation of the engine 17 which is transmitted to an input terminal B of the central processing unit 41 and to switching means indicated generally by the letter Y. This signal x is indicative of whether or not the engine 17 is in the on or off state.

Input terminal B functions as an "interruption port". Each time the alternate current voltage signal x is received by the central processing unit 41, a timer 41A is initialized. When the signal x is not received, the timer 41A is started to count down a predetermined time, at which time if the signal x is still not received the CPU shuts off.

Switching means Y is adapted to turn the indicator plate 43 on and off on the basis of the signal x ouputted by the generator coil 47, or on the basis of current received directly from the battery 49 for the predetermined period of time after a manual start switch 54 is depressed. The switching means Y selectively connects and disconnects the CPU 41 from a constant voltage circuit 51 which supplies a power voltage $V_{cc}$ to the CPU 41. A pnp transistor 52 is positioned between the constant voltage circuit 51 and the battery 49. This pnp transistor 52 is actuated or turned on by an npn transistor 53 which, in turn, is actuated or turned on by the signal x, or alternatively by the manual start switch 54 for the predetermined period of time, for example 30 seconds, even if the engine 17 is not started. Thereafter, actuation of the transistors 52 and 53 is based solely on the signal x.

When the engine start switch 54 is depressed, charge from the battery 49 flows to the base of npn transistor 53 so as to actuate transistors 53 and 52 for the predetermined period of time, i.e., 30 seconds. When this occurs, the constant voltage circuit 51 is actuated to supply voltage $V_{cc}$ to the central processing unit 41 to actuate the CPU 41. An npn transistor is indicated by the reference numeral 55 and is of the self hold type which is actuated to earth the base of transistor 52 when the RS (running/stop) output terminal of the central processing unit 41 is at a high (H) level, which occurs when the central processing unit 41 is in the operational state.

If the engine 1 is not started during that predetermined time, the CPU 41 will be disconnected from the constant voltage circuit 51 so as to turn off the indicator plate 43. If, however, the engine 17 is started during that time, the signal x generated by the generator coil 47 when the engine 17 is running will continue to maintain the switching means Y, CPU 41 and indicator plate 43 in the actuated state after the manual start switch 54 is released.

The operation of the indicator assembly will now be described with reference to FIG. 5. At the outset, the engine start switch 54 is depressed (step 100) to turn on or actuate the transistors 53 and 52 (steps 102 and 104 respectively). When this occurs, the power source voltage $V_{cc}$ is supplied to the CPU 41 (step 106) to actuate the CPU 41 (step 108). When the start switch 54 which is operatively connected to a starter motor of the engine 17 is depressed so as to start the engine 17 (step 110), the signal x is inputted at the start of the engine 17 to the input terminal B of the the CPU 41 and to npn transistor 53 (step 112). After the start switch 54 is released when the engine is started, the signal x is used to continue to actuate the transistors 53 and 52 (step 102). If the engine 17 is not started within the predetermined period of time after the start switch 54 is depressed, these transistors will turn off.

When the CPU 41 is actuated (step 108), the RS terminal thereof is at the H level so that the transistor 55 is turned on so as to maintain transistor 53 in the actuated state (step 114). Since the CPU 41 is in the operating or actuated state, the fluid level in tank 25 is indicated on the indicator plate 43 according to the output of fluid level detector 26 (step 116).

As long as the engine 17 continues to run, the fluid level will be indicated on the indicator plate 43. If, however, the the engine 17 is stopped and the signal x is not inputted, the timer 41A of the CPU 41 is started to count down the predetermined period of time (step 120). At step 122, a determination is made as to whether or not the signal x has been received during this time period. If the signal x is received, the timer 41A is cleared (step 124) so as to maintain actuation of the indicator plate 43. When the predetermined period of time (i.e., 30 seconds) has elapsed without receipt of the signal x by the CPU 41 (step 126) the CPU 41 reduces the RS terminal to an L or low level. The transistors 55 and 52 are then turned off (step 128) to break the connection of the CPU 41 with the power source, and thereby to turn off the indicator plate 43 (step 130).

In the above embodiment, when the start switch 54 is depressed, the CPU 41 operates to actuate the indicator plate 43 for the predetermined period of time, for example 30 seconds, even if the engine 17 is not started. However, the present invention may also be arranged so that the indicator plate 43 is actuated only by the signal x produced by the generator coil 47. It is also possible with this invention to use various other types of indicating means such as the analog type in place of the liquid crystal indicator plate 43 and LCD driver 44. Further, the indicator assembly described herein is not limited only to determining the fuel level in a fuel tank but may also be used to determine oil level, temperature, speed of the watercraft and speed of the engine. Moreover, although an embodiment of the invention has been illustrated and described, various changes and modifications may be made without departing from the spirit and scope of the invention, as defined by the appended claims.

We claim:

1. An indicator assembly for a small watercraft having an engine comprising, first detecting means for detecting an operating condition of the watercraft, instrument indicating means for indicating the detected operating condition of the watercraft, a central processing unit for selectively actuating said instrument indicating means, an operator direct actuated switch, and switching means not directly actuated by the operator, both for selectively actuating said central processing unit, second detecting means for outputting a signal to said switching means when the engine is in a running condition, wherein said instrument indicating means is turned on when said switching means receives the signal from said second detecting means and wherein said instrument indicating means is turned off if the signal is not outputted by said second detecting means for a first predetermined time after the engine is turned off, and wherein said switching means is also actuated, for a second predetermined time after said switch is actuated, for actuating said central processing unit to turn on said instrument indicating means for said second predetermined time and thereafter maintaining said instrument indicating means in an on state only when said switching means receives the signal from said second detecting means.

2. An indicator assembly as recited in claim 1, wherein said first detecting means comprises a fluid level detector and the detected operating condition of the watercraft is a fluid level.

3. An indicator assembly as recited in claim 1, further comprising a constant voltage circuit for supplying voltage to said central processing unit and wherein said switching means comprises first and second transistors, responsive to said switch for the second predetermined time after said switch is actuated or when said switching means receives the signal, for selectively connecting said central processing unit to said constant voltage circuit.

4. An indicator assembly as recited in claim 1, wherein said second detecting means comprises an electromagnetic generator having a generator coil.

5. An indicator assembly as recited in claim 3, wherein said switching means further comprises a third transistor, responsive to the signal, for maintaining said first transistor in the actuated state when said central processing unit is actuated.

6. An indicator assembly as recited in claim 1, wherein said first detecting means outputs a detection signal indicative of the detected operating condition of the watercraft to said central processing unit.

7. An indicator assembly as recited in claim 2, wherein said fluid level detector comprises a plurality of floats each having a magnet, a plurality of reed switches one associated with each float, and a plurality of resistors one associated with each reed switch, wherein each reed switch is opened and closed by its associated magnet based on the position of the associated float.

8. An indicator assembly for a small watercraft having an engine comprising, first detecting means for detecting an operating condition of the watercraft, instrument indicating means for indicating the detected operating condition of the watercraft, a central processing unit for selectively actuating said instrument indicating means, switching means for selectively actuating said central processing unit, second detecting means for outputting a signal to said switching means and to said central processing unit when the engine is in a running condition, wherein said instrument indicating means is actuated when said switching means and said central processing unit receive the signal from said second detecting means and wherein said instrument indicating means is turned off if the signal is not outputted by said second detecting means and is not received by said central processing unit for a first predetermined time after the engine is turned off, and wherein said central processing unit includes timer means for counting the first predetermined time and for shutting off said central processing unit if the signal is not received by said central processing unit for the first predetermined time.

9. An indicator assembly as recited in claim 1, wherein said second detecting means also outputs the signal to said central processing unit when the engine is in a running condition, wherein said instrument indicating means is turned on when said switching means and said central processing unit receive the signal from said second detecting means and wherein said instrument indicating means is turned off if the signal is not received by said central processing unit for the first predetermined time after the engine is turned off.

* * * * *